United States Patent
Lu et al.

(10) Patent No.: US 8,346,520 B2
(45) Date of Patent: Jan. 1, 2013

(54) SYSTEMS AND METHODS FOR DYNAMIC PROCESS MODEL CONFIGURATION BASED ON PROCESS EXECUTION CONTEXT

(75) Inventors: Ruopeng Lu, Calamvale (AU); Christian Janiesch, East Brisbane (AU); Kai Stettner, Siegen (DE)

(73) Assignee: SAP AG, Walldorf (DE)

( * ) Notice: Subject to any disclaimer, the term of this patent is extended or adjusted under 35 U.S.C. 154(b) by 652 days.

(21) Appl. No.: 12/559,217

(22) Filed: Sep. 14, 2009

(65) Prior Publication Data

US 2011/0066456 A1   Mar. 17, 2011

(51) Int. Cl.
*G06G 7/48* (2006.01)

(52) U.S. Cl. ......... 703/6; 705/7.12; 705/7.27; 705/7.37

(58) Field of Classification Search .................. 703/6, 1; 717/105; 705/28, 8, 75, 7.22; 707/103 R, 707/690; 715/772
See application file for complete search history.

(56) References Cited

U.S. PATENT DOCUMENTS

| | | | |
|---|---|---|---|
| 6,937,993 B1 * | 8/2005 | Gabbita et al. | 705/7.22 |
| 2002/0138449 A1 * | 9/2002 | Kendall et al. | 705/75 |
| 2007/0156545 A1 * | 7/2007 | Lin | 705/28 |
| 2007/0162494 A1 * | 7/2007 | Schneider | 707/103 R |
| 2008/0270977 A1 * | 10/2008 | Nucci et al. | 717/105 |
| 2010/0174687 A1 * | 7/2010 | Krishnaswamy et al. | 707/690 |
| 2010/0179847 A1 * | 7/2010 | Cope et al. | 705/8 |
| 2010/0223570 A1 * | 9/2010 | Gerstl et al. | 715/772 |

* cited by examiner

*Primary Examiner* — Kandasamy Thangavelu
(74) *Attorney, Agent, or Firm* — Schwegman Lundberg Woessner P.A.

(57) ABSTRACT

Methods and systems to dynamically configure a process model based on process execution context are described. In one example embodiment, a system to dynamically configure a process model can include a context engine, a rules engine, and a business process engine. The context engine can maintain context information related to an executable business process model. The context information is dynamically extensible during execution of the executable business process model. The rules engine can obtain a relevant context form the context information. The relevant context can be associated with a step and a rule to control the step within the executable business process model. The business process engine can execute the executable business process model and can dynamically configure the executable business process model during execution based on application of the relevant context by the rules engine.

24 Claims, 12 Drawing Sheets

SYSTEMS AND METHODS FOR DYNAMIC PROCESS MODEL CONFIGURATION BASED ON PROCESS EXECUTION CONTEXT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, SAP AG. All Rights Reserved.

TECHNICAL FIELD

Various embodiments relate generally to the field of business process modeling, and in particular, but not by way of limitation, to a system and method for dynamic process model configuration based on process execution context.

BACKGROUND

Business process modeling may be deployed to represent the real-world processes of an enterprise on paper or within a computer system. Business process modeling may for example be performed to analyze and improve current enterprise processes. Managers and business analysts seeking to improve process efficiency and quality may turn to business process modeling as a method to achieve the desired improvements. In the 1990s, the vision of a process enterprise was introduced to achieve a holistic view of an enterprise, with business processes as the main instrument for organizing the operations of an enterprise. Process orientation meant viewing an organization as a network or system of business processes. The certain benefits of investing in business process techniques were demonstrated in efficiency, increased transparency, productivity, cost reduction, quality, faster results, standardization, and, above all, in the encouragement of innovation, leading to competitive advantage and client satisfaction.

The processes created through business process modeling are often complex and may contain many variants or potential process flows. While information technologies (IT) have been a key enabler in achieving some of the benefits mentioned above, these technologies have been slow to fully deal with all the complexities of executing business process models. IT systems are particularly poor at handling any sort of real-time configuration of business process models. Current IT system may implement some sort of static configuration parameters, which fail to fully consider all the potential environmental inputs to a complex business process.

BRIEF DESCRIPTION OF THE DRAWINGS

Some embodiments are illustrated by way of example and not limitation in the figures of the accompanying drawings in which.

DETAILED DESCRIPTION

Figure 1:
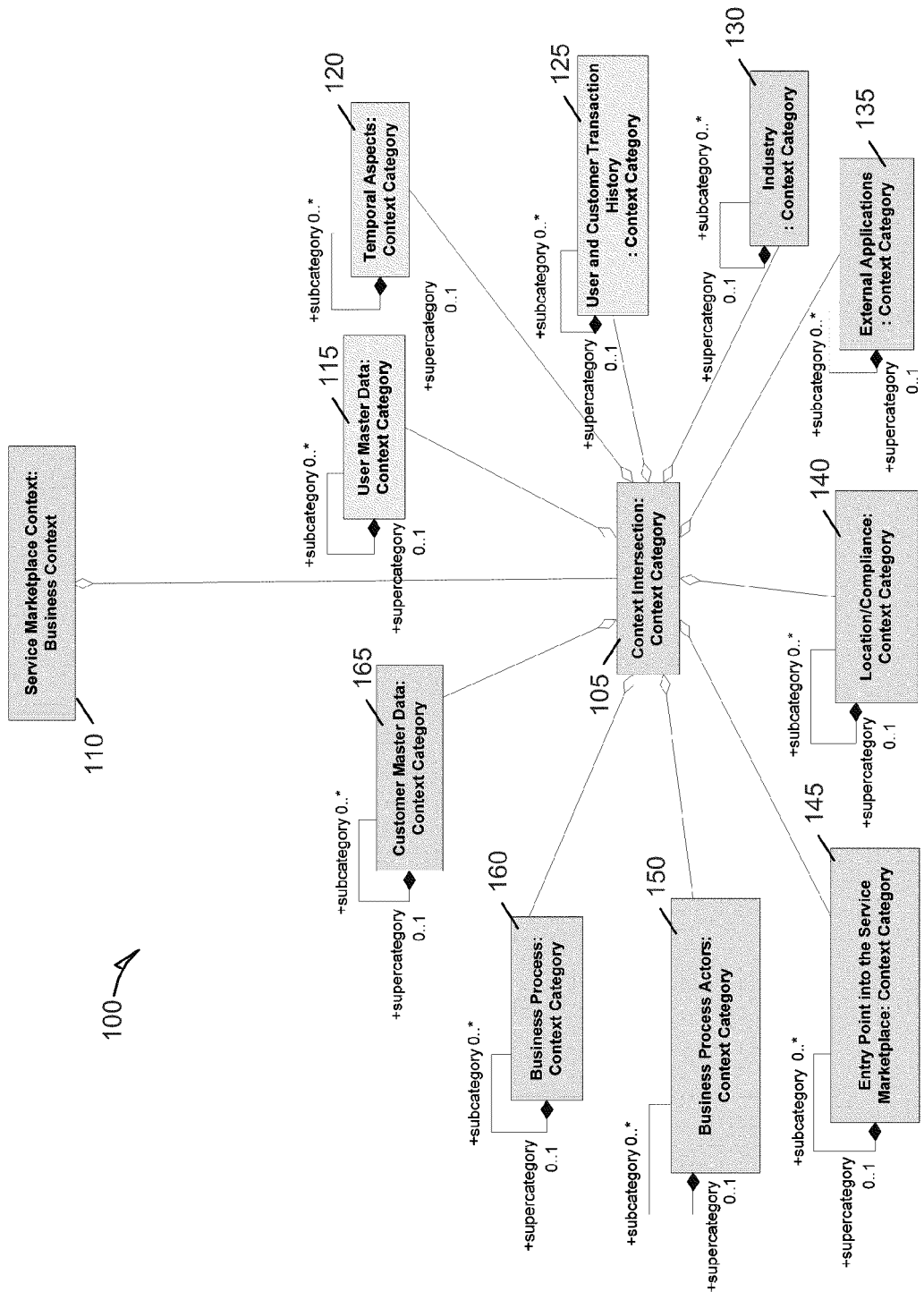
FIG. 1 is a block diagram illustrating an execution context data structure, according to an example embodiment.

Disclosed herein are various embodiments of the present invention for providing methods and systems for dynamic process model configuration based on process execution context.

A typical business process model can comprise a large number of tasks that may or may not be necessary for any particular execution of the business process. Depending upon the various inputs to the business process, only a subset of potential tasks, modeled within the business process model, may need to be executed. The various inputs that drive decisions within a business process may not be available prior to execution of the business process. In some cases it is possible for the inputs to be unknown prior to execution. Therefore, decisions affecting the process flow of the business process may need to be taken at run-time. The various inputs can be regarded as the context of execution for the business process. Applying this concept to a user, the user's context can enable process model configuration based on the (unique) user's perspective. In an example, a context model is introduced that can be used in the embodiment of a service marketplace, among other things. The context model can be used to execute variable workflows through the dynamic configuration of the underlying process model.

Service Marketplace Example

Software as a Service (SaaS) is a software application delivery model where a software vendor develops a web-native software application to host and operate over the Internet for use by its customers. Typically, customers do not pay for owning the software itself but rather for using it. The software is used through either a web-based user interface (UI) or an application programming interface (API) accessible over the Web and often written using Web Services. In this sense, SaaS software applications are exposed as services or value-added services. SaaS is becoming an increasingly prevalent delivery model as underlying technologies that support Web Services and service-oriented architecture (SOA) mature.

Web Services are defined by the World Wide Web Consortium (W3C) as a software system designed to support interoperable machine-to-machine interaction over a network. A Web Service has an interface described in a machine-processable format (specifically Web Services Definition Language (WSDL)). Other systems can interact with a Web Service in a manner prescribed by its description using simple object access protocol (SOAP) messages. The SOAP messages are typically conveyed using Hypertext Transfer Protocol (HTTP) with an eXtensible Mark-up Language (XML) serialization in conjunction with other Web-related standards. Web Services can be thought of as Internet APIs that can be accessed over a network, such as the Internet, and executed on a remote system hosting the requested services. Other approaches with nearly the same functionality as Web Services are Object Management Group's (OMG), Common Object Request Broker Architecture (CORBA), Microsoft's Distributed Component Object Model (DCOM) or Sun Microsystems's Java/Remote Method Invocation (RMI).

In the SaaS paradigm, there are service providers and service consumers. Service providers usually have a core business, such as processing visa applications for the government. The service provider uses specific software systems that run on their infrastructure to provide their specific services. Service consumers can provide content and services to their internal or external user base through aggregation of services provided by service providers. In this example, the service consumer is an end user that interacts with the service providers through various supply channels to retrieve and integrate web-based services from service providers.

Services in the SaaS paradigm are usually delivered using a Service Delivery Platform (SDP), which manages the service delivery from data source and functional implementation to the actual end user. A service marketplace (also software/applications marketplace) may be an Internet-based virtual venue for facilitating the interactions between the application or service provider and the service consumer. The service marketplace can handle all facets of software and service discovery and provisioning processes. Service marketplaces can be vendor-specific, such as the SAP Service Marketplace (from SAP AG, Walldorf, Germany), the Microsoft Windows™ Marketplace (from Microsoft Corp., Redmond, Wash.), or generic SaaS marketplaces such as SaaSPlaza (from SaaSPlaza, Encinitas, Calif.) and WebCentral Application Marketplace (from Melbourne IT Group, Melbourne, Australia).

The service marketplace may perform a number of operations. First, the service marketplace allows service providers to publish their service offers and relevant information to the marketplace. The published information can be structured and managed by the marketplace, which typically contains business information of service providers, usage conditions, and cost of the service offerings. Second, the service marketplace allows service consumers to discover services through browsing the available service offers in different service categories or through search by content keywords.

Business processes are generally considered to be a sequence of activities performed within a company or an organization. In the context of this example, a process can be defined as a timely and logical sequence of activities that work on a process-oriented business object. In this example, workflows can be considered to be the portion of a work process that contain the sequence of functions and information about the data and resources involved in the execution of these functions. Thus, a workflow can be considered to be an automated representation of a business process.

Central to this example embodiment is the concept of context information. Context can be defined as any information that is used to characterize the situation of entities. An entity can be a person, a place, or an object that may be considered relevant to the interaction between a user and an application, including the user and application themselves. In certain examples, an entity can be a person, a place, an object, or any piece of data that may be considered relevant to the business process. For example, context can be used for adapting an architecture or application for use by a mobile device. In an example delivering information over the Internet, context information (e.g., device type) can be based on a W3C standard that facilitates delivering web content independent of the device.

In a web-based example, execution context can be defined as a set of attributes that characterizes the capabilities of the access mechanism, the preferences of the user, and other aspects of the context into which a web page is to be delivered. A goal of the context is to generate web content in a way that it can be accessed widely (e.g. by anyone, anywhere, anytime, anyhow). Another goal of the context can be to restrict access to content based on identity, location, time, or device, among other things. Considering context in web applications, this can be achieved because the application is aware of different environments and user settings.

Consolidated Context Model

A consolidated context model can be used within the service marketplace, as outlined in Table 1:

| Context Category | Description |
| --- | --- |
| Customer Master Data | The category contains all information related to the customer of the service marketplace. Mostly, this in an organization that procured several licenses of the application. |
| Industry | The category includes the industry in which the individual is located. |
| Location and Compliance | The category for all information about location and compliance. In this example, these categories are together, because they are strongly related. |
| External Applications | Contains the external application of a person or organization. |
| Entry Point into the Service Marketplace | The entry point of the user who entered the marketplace. |
| User and Customer Transaction History | Transaction history of user and customer. |
| User Master Data | The specific data of the individual who is logged on to the marketplace. |
| Business Process Actors | All actors involved in the current business situation of the customer or user. |
| Business Processes | Information about the current business process that the marketplace is embedded in. |
| Time | Temporal information about the actors or the marketplace itself. |
| Services | Information about services traded in the marketplace. |

FIG. 1 is a class diagram illustrating an execution context data structure 100, according to an example embodiment. A class diagram illustrates a service marketplace context 110 which is defined by a context intersection 105. In this example, the context intersection 105 includes a variety of context categories, including user master data 115, temporal aspects 120, user and customer transaction 125, industry 130, external applications 135, location and compliance 140, entry point into the service marketplace 145, business process actors 150, business processes 160, and customer master data 165. The context data structure 100 combines, via a context intersection 105, various context categories to derive the service marketplace context 110 for a specific use case. Using the construct of a context intersection 105, the context data structure 100 puts multiple context values of different context categories into the context intersection 105. In some examples, arbitrary subsets of context values can be generated from the different context categories. Furthermore, there is no requirement for a specific hierarchy. That means that every context category can be the subcategory of a superior one and can have multiple subcategories. The context data structure 100 can be readily extended to accommodate context not considered in advance. The context intersection 105 makes it possible to set up a context framework and a generic structure. Based on this generic structure, it is possible for a modeller to build up the concrete hierarchy for the categories. If the context categories are not sufficient, it is possible to extend the category framework to include more categories. If the user wants to have a specific subcategory for a context category, it is possible to easily configure the current setting and add this subcategory. The context data structure 100 is designed upon extensibility and flexibility. The service marketplace context 110 works for this service marketplace type, but may not for every service marketplace instance. For example, the category industry 130 can be viewed as primarily a subcategory of customer master data 165, but in another example the category industry 130 can be a subcategory of user master data 115.

In this example, dynamic process model configuration based on execution context is implemented in a prototypical service marketplace. Within the service marketplace, a customized procurement lifecycle can be offered, which includes services discovery, pricing, Request for Quotation (RFQ), bargaining, ordering, and contracting.

In this example, the customer interaction process can be summarized as follows: a customer can access the marketplace from an external application, which in general brings in a solution scope or a business configuration to the marketplace. Based on the pre-existing configuration of those applications, the marketplace can be customized according to the differences of each customer. This context information can also be used to match the customer profile with other customer profiles. This can be referred to as the Community. Based on the Community, the process flow in the marketplace can differ.

Besides customer data, the service marketplace is also connected to an application backbone and a partner infrastructure. Because the application backbone cannot cover all demanded services, partners can make service offerings available on the platform. Therefore, the service marketplace provides information about which partners can offer which specific services. After completing the ordering process, the request will be sent to the application backbone infrastructure. Inside the backbone, the requested service can be carried out. Afterwards, a personalized customer solution will be constructed based on the content and service repository. Implementing the service solution at the customer finishes the depicted lifecycle of the marketplace process.

Architecture of the Service Marketplace

Figure 2:
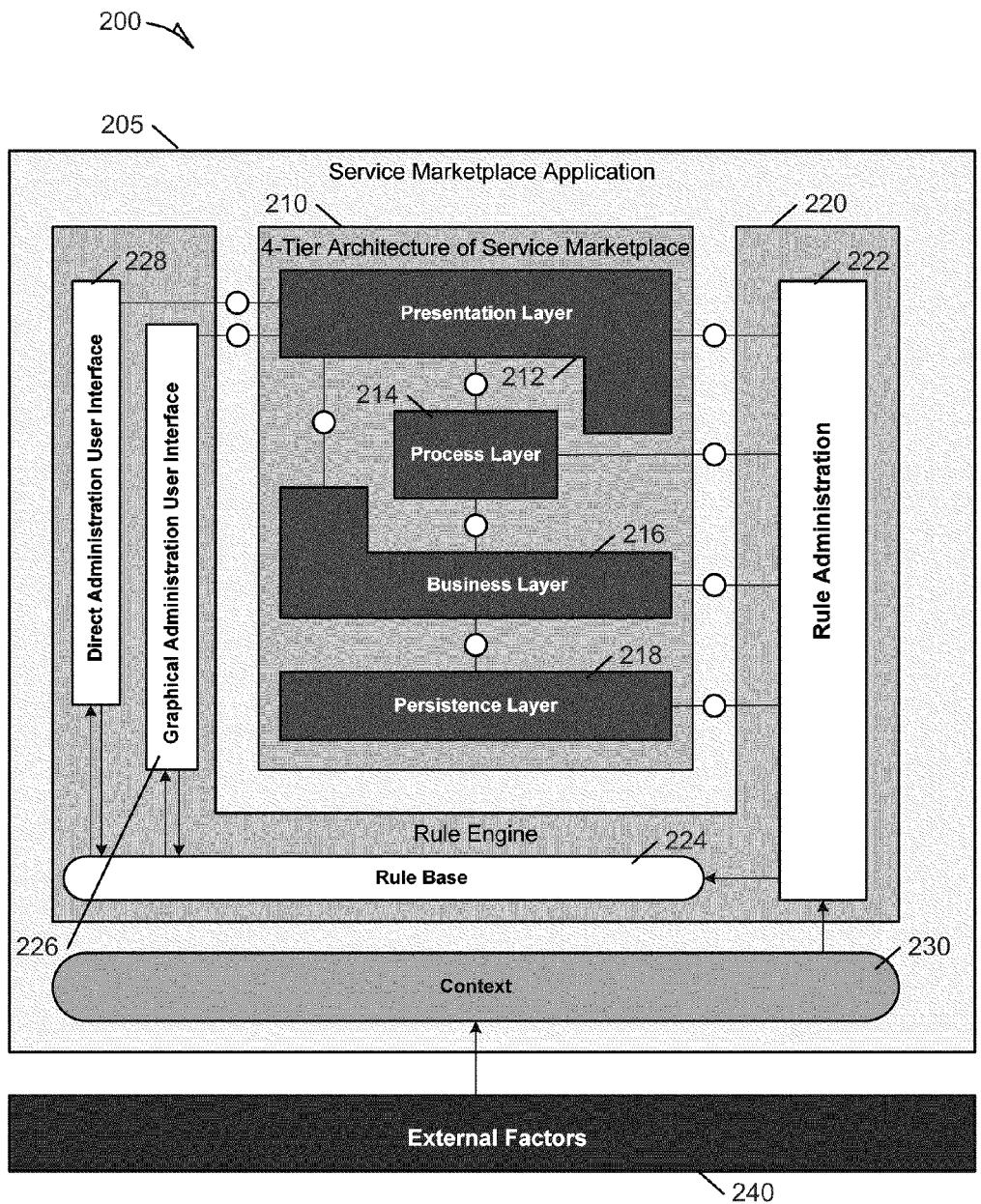
FIG. 2 is a block diagram illustrating a high-level architecture to apply context within a service marketplace application, according to an example embodiment.

FIG. 2 is a block diagram illustrating a high-level architecture to apply context within a service marketplace application system 200, according to an example embodiment. The example system 200 is shown include a four-tier architecture system 210, a rules engine 220, a context module 230, and external factors 240. In an example, the four-tier architecture system 210 may include a presentation layer 212, a process layer 214, a business layer 216 and a persistence layer 218. In an example, the rules engine 220 can include a rule administration module 222, a rule base 224, a graphical administration user interface 226, and a direct administration user interface 228.

In an example, the outermost component is the external factors agent 240. External factors can include factors that are beyond the control flow of the service marketplace architecture, such as the weather or the customer master data. The external factors agent 240 can be an active component and can have a unidirectional relation to the context module 230. In certain examples, values of the context are based on corresponding external factors and the external factor agent 240 writes external factors into the context module 230. In these examples, the external factors are not dependent on context.

In an example, the outermost component of the service marketplace application 205 is the context module 230. In this example, the context module 230 can be a passive component and is created and modified based on the external factors agent 240. Though inside the service marketplace application 205, the context module 230, and thus the context data, is beyond the control flow of the application. In addition to the context module 230, some example embodiments include a context administration agent (not shown) that can provide functionality to keep the context structure extensible and modifiable. The context administration agent can interact with presentation layer 212 to facilitate the context administration using a graphical user interface (GUI). Thus, the context structure can be changed by an authorized user role using the context administration agent. In an example, the authorized user role can be either the application administrator or a particular context engineer who is just responsible for maintaining the context.

In an example, the rules engine 220 is an intermediary between the context module 230 and the four-tier architecture system 210. Based on the rules stored in the rule base 224, the context module 230 can be used to adapt the service marketplace application 205. Thus, the rule administration module 222 compares the values in context module 230 and rule base 224 and, based on the results of the comparison, can adapt all layers of the four-tier architecture system 210. Additionally, within some examples, the rules engine 220 encompasses two administration user interfaces 226, 228. The direct administration user interface 228 and the graphical administration user interface 226 can provide the ability to modify the adaptation rules stored in the rule base 224. In addition, both administration user interfaces 226, 228 know where to put the new rule in the existing rule hierarchy. In certain examples, the administration user interfaces 226, 228 can be accessed only by the application administrator or by a particular rule engineer whose responsibility is to maintain the rule base. The graphical administration user interface 226 can provide the rule engineer with a GUI to edit the rule base 224. Using the direct administration user interface 228, a rule engineer can directly access the rule base. Direct access to the rule base 224 may allow for more complex rule structures to be created, which may require some knowledge about the concrete rule syntax.

In an example, the four-tier architecture system 210 portion of the service marketplace application 205 can be adapted by the rule administration module 222 at the presentation layer 212, the process layer 214, the business layer 216 and the persistence layer 218 using the rule base 224, information from the rule base 224, and the context module 230. In an example, the presentation layer 212 hosts the user interfaces 226, 228 and can provide access to the process layer 214 and business layer 216. The process layer can be in between the user interfaces (presentation layer 212) and the business logic in the business layer 216 and can have interactions with both actors. In certain examples, the business logic in the business layer 216 is the only layer that can interact with the persistence layer.

Conceptual Overview

Complex process models may comprise a large number of tasks. Each of the tasks within a particular process model may or may not be used during a particular execution of the process. For example, only a subset of the defined tasks may be used, but often the decision regarding which tasks requires information which is only available during execution. Historically, these decisions are based on hard-coded parameters or through user interaction. In an example, an aggregation of the various sources of user information comprising an execution context related to the process model can be used as a basis for a dynamic process model (and thus workflow configuration). The execution context can be extensible and may change at run-time.

Figure 3A:
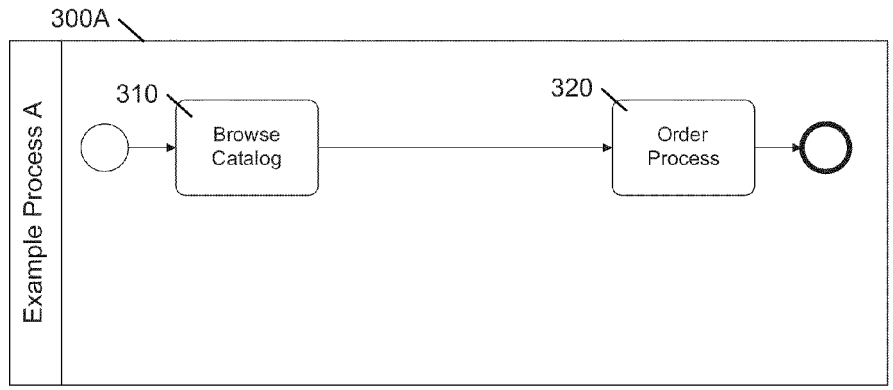
FIGS. 3A-3C are block diagrams illustrating various example business processes, according to an example embodiment.
Figure 3B:
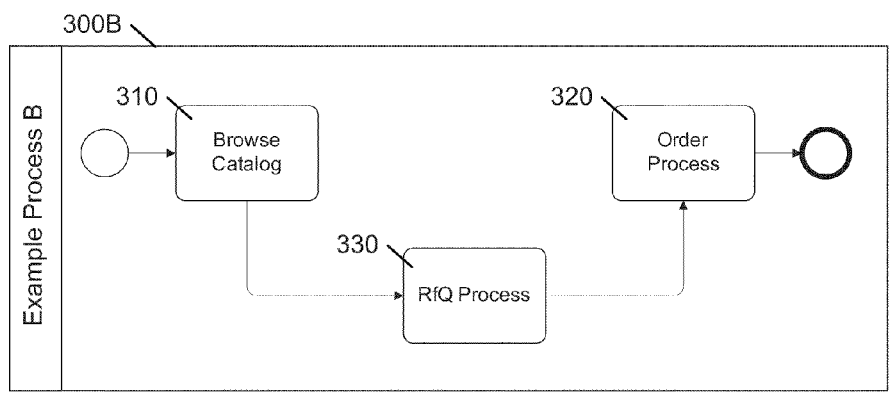
Figure 3C:
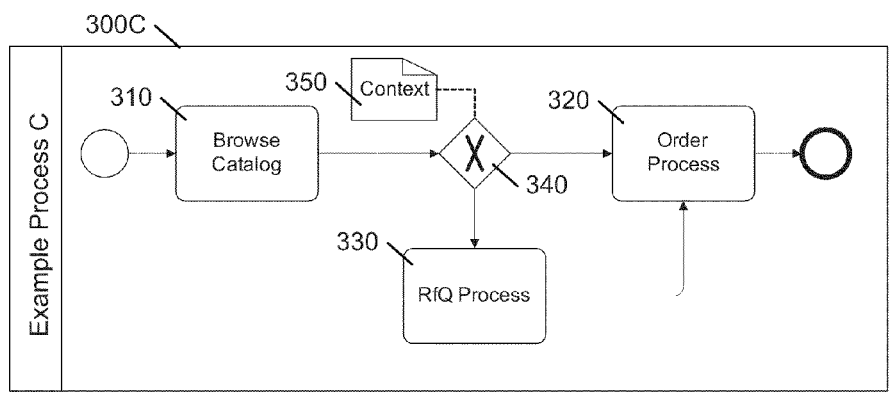

FIGS. 3A-3C are block diagrams illustrating various example business processes, according to an example embodiment. The examples 300A, 300B, and 300C depict a relatively simple process that involves a service consumer browsing a catalogue to buy a service. Depending on the consumer's context, the user interface can be different, but more importantly the ordering process that follows the catalogue browsing can be different.

FIG. 3A is a block diagram illustrating a process A 300A, according to an example embodiment. The process A 300A includes a browse catalogue 310 and an order process 320. In this example, the service consumer's context provides information that there is a purchasing contract in place between the consumer's organization and the service provider selected in the catalogue. Consequently, for this example process A 300A there is no RfQ process necessary.

FIG. 3B is a block diagram illustrating a process B 300B, according to an example embodiment. The process B 300B includes a browse catalogue operation 310, an order process 320, and an RfQ process 330. In this example, the service consumer's context provides information that there is no current agreement in place between the consumer's organization and the service provider selected from the catalogue. In certain examples, the selected service may be more expensive than the current purchasing guidelines allow, thus invoking the RfQ process. Consequently, process B 300B includes an RfQ process 330.

FIG. 3C is a block diagram illustrating a process C 300C, according to an example embodiment. The process C 300C includes a browse catalogue operation 310, an order process 320, an RfQ process 330, a decision gate 340, and an execution context 350. In this example, the execution context 350 is an input to the decision gate 340. The process C 300C allows for dynamic process configuration at run-time. The overall process model, depicted by process C 300C, can be configured based on the service consumer's context at run-time. This approach can be adapted to configure any user-centric application. A dynamic process configurable at run-time proposes an extensible information mash-up/integration approach for contextual information that can be used to feed a configuration abstraction layer.

Example Implementation

Figure 4A:
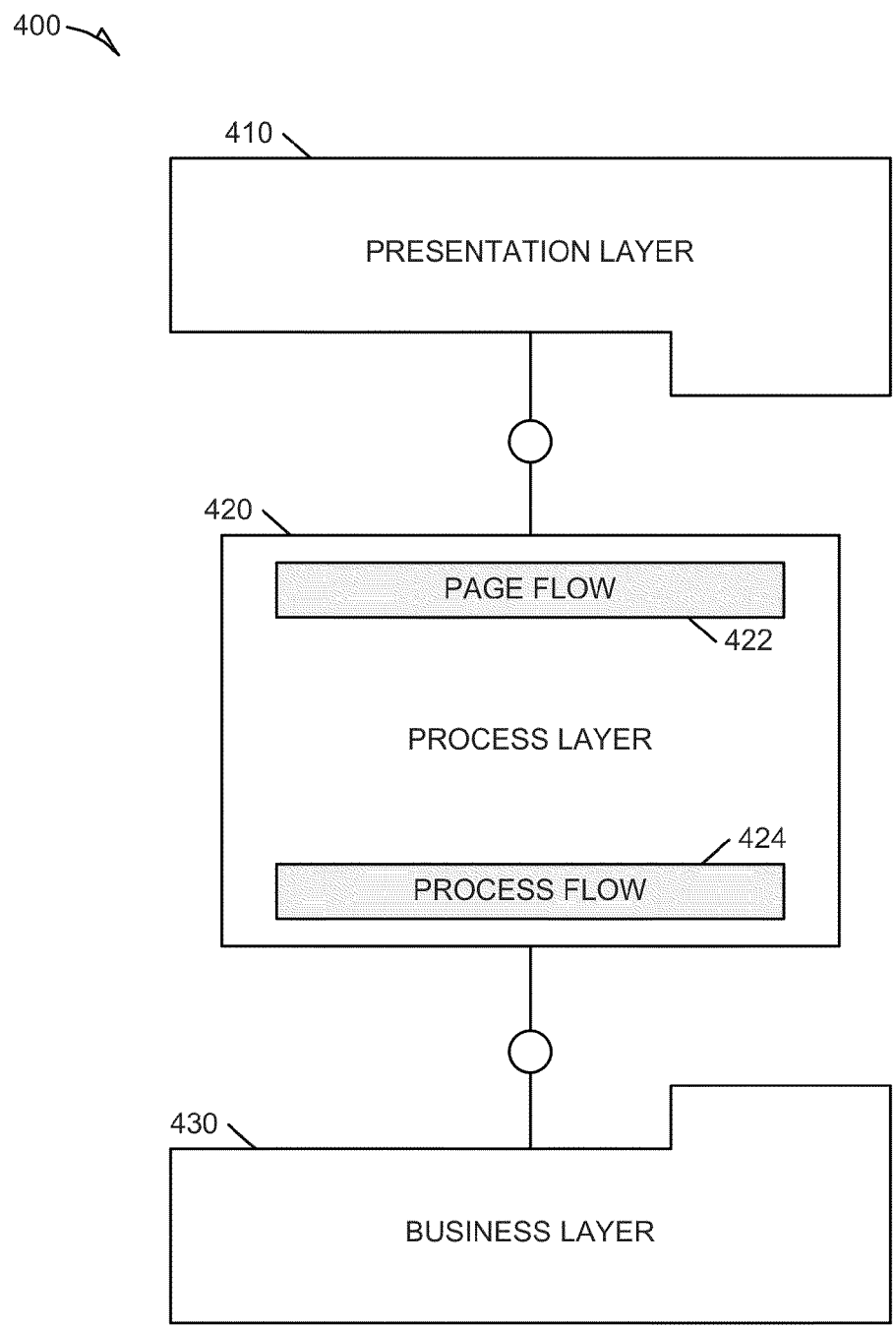
FIG. 4A is a block diagram of the four tier architecture with the components of a process layer extracted, according to an example embodiment

An example implementation of the service marketplace architecture uses the jBPM process engine (from JBoss, by Red Hat, Inc. of Raleigh, N.C.). jBPM is based on plain Java™ software code and, thus, can easily be integrated into an existing Java™ based architecture. Behind the workflow, there is the concept of a state machine and especially Petri nets (place/transition net). FIG. 4A is a block diagram of the four tier architecture 210 with the components of a process layer extracted, according to an example embodiment. A system 400 includes a presentation layer 410, a process layer 420, and a business layer 430. In an example, the process layer 420 includes a page flow engine 422 and a process flow engine 424. In this example, system 400 shows an extract of the entire service marketplace application 205 and depicts how the process layer 214 is embedded in the four-tier architecture 210.

In an example, the page flow engine 422 of jBPM interacts with the presentation layer 410. The process flow engine 424 can collaborate with the business layer 430 of the architecture. The jBPM process engine can persist data related to the workflow or process flow in a database (not shown). Persisting the workflow data can guarantee that the workflow can outlast multiple sessions, thereby assisting in supporting workflow that spans more than one session and more than one logged in user.

An example difference between business processes and page flows within an example programming framework involves the concept of spanning sessions. A page flow can refer to one single conversation. The component of such a conversation may be a short-running interaction with a single user. Thus, the page flow steers the page navigation in terms of which pages to which the user is permitted to navigate, based on the current conversation. In contrast, the business process can span multiple conversations and multiple users. In an example, the page flow is stored in the session context, while the business process is persisted in the database.

Figure 5:
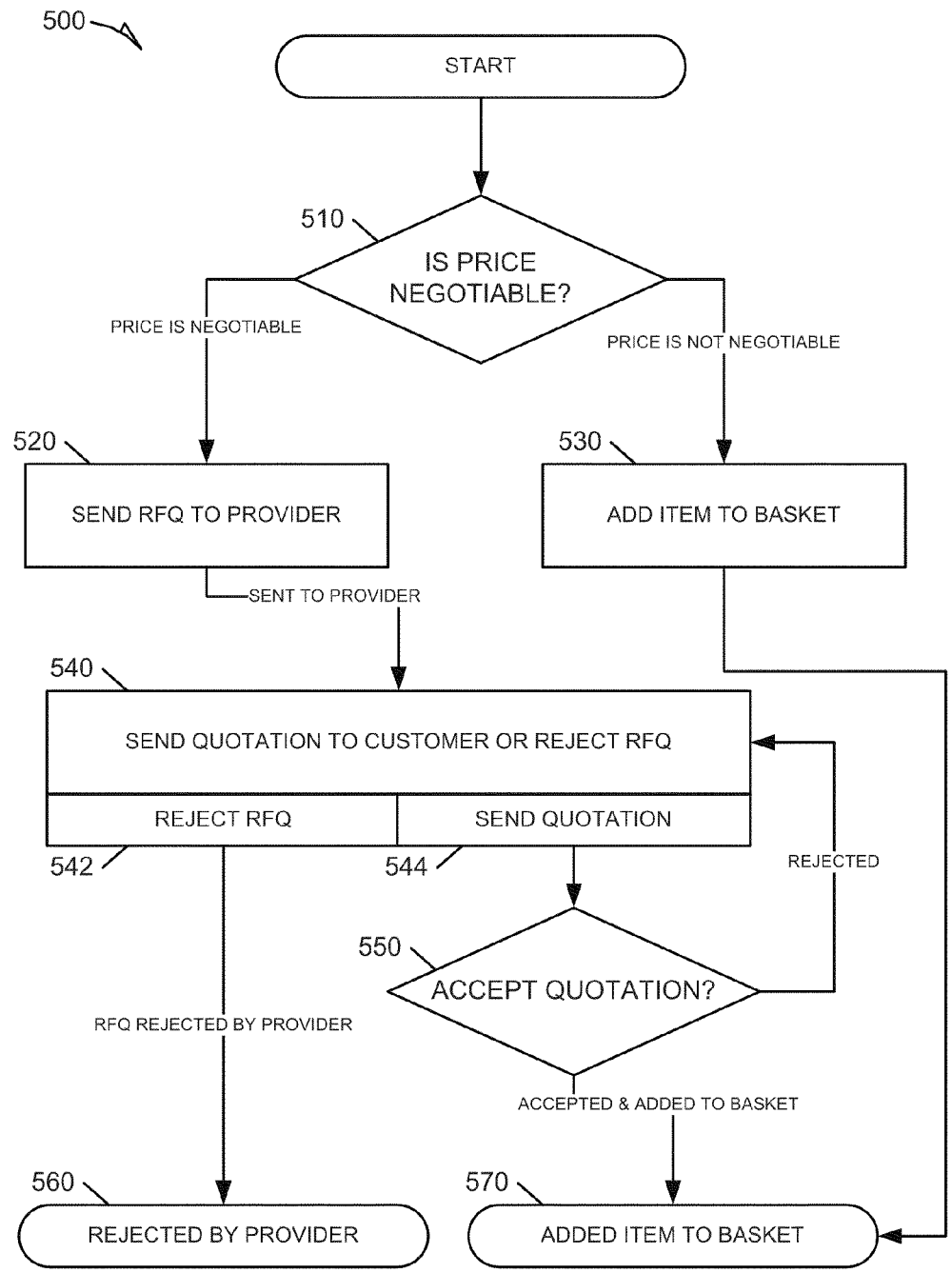
FIG. 5 is a flowchart illustrating a purchasing workflow within a service marketplace, according to an example embodiment.

FIG. 5 is a flowchart illustrating a purchasing workflow within a service marketplace, according to an example embodiment. A workflow 500 includes a price negotiable decision at 510, a send RfQ to provider operation at 520, an add item to basket operation at 530, a send quotation to customer or reject RfQ operation at 540, an accept quotation decision at 550, a rejected by provider termination at 560, and an added item to basket termination at 570. In certain examples, the send quotation to customer or reject RfQ operation at 540 can include a reject RfQ operation at 542 and a send quotation operation at 544. This example implementation focuses on an ordering process because the process is complex enough to provide a good demonstration of the capability included in the jBPM based implementation.

The workflow 500 depicts one subset of the ordering process inside the service marketplace and depicts adding one service to the shopping basket. Whether the price of the service is negotiable or not determines whether an RfQ has to be send or the service can simply be added to the basket, respectively. The workflow 500 begins at 510 with a decision or branching point that determines whether the price of the selected service is negotiable. In an example, if the price is fixed, the workflow 500 can continue at 530 with the user adding the item to the virtual shopping basket. In this example, the workflow 500 then terminates at 570 with the item added to the basket.

In an example where the price is negotiable, the process is slightly more complex. In this example, the workflow continues at 520 where an RfQ can be sent to a provider. At 540, the workflow 500 can continue, with the provider deciding whether to send a quotation to the customer at 544 or to reject the RfQ directly at 542. If the provider chooses to reject the RfQ at 542, then the workflow 500 ends at 560 with the RfQ rejected by the provider. In some examples, the customer can be notified of the rejected RfQ. If the provider sends a quotation back to the customer at 544, the negotiation process has started. In this example, once the customer receives the quotation from the provider, the customer decides whether to accept the quotation at 550. In an example, at 550, the customer can reject the RfQ, propose a new price to the provider, or accept the RfQ from the provider. In the example depicted by workflow 500, only the provider can finally reject the RFQ. However, in other examples, the customer can finally reject an RFQ as well. At 550, if the customer accepts the quotation, the workflow finishes at 570 with the service added to the basket. The workflow 500 ends either when the provider rejects the RFQ or when the customer accepts the quotation of the provider.

Figure 4B:
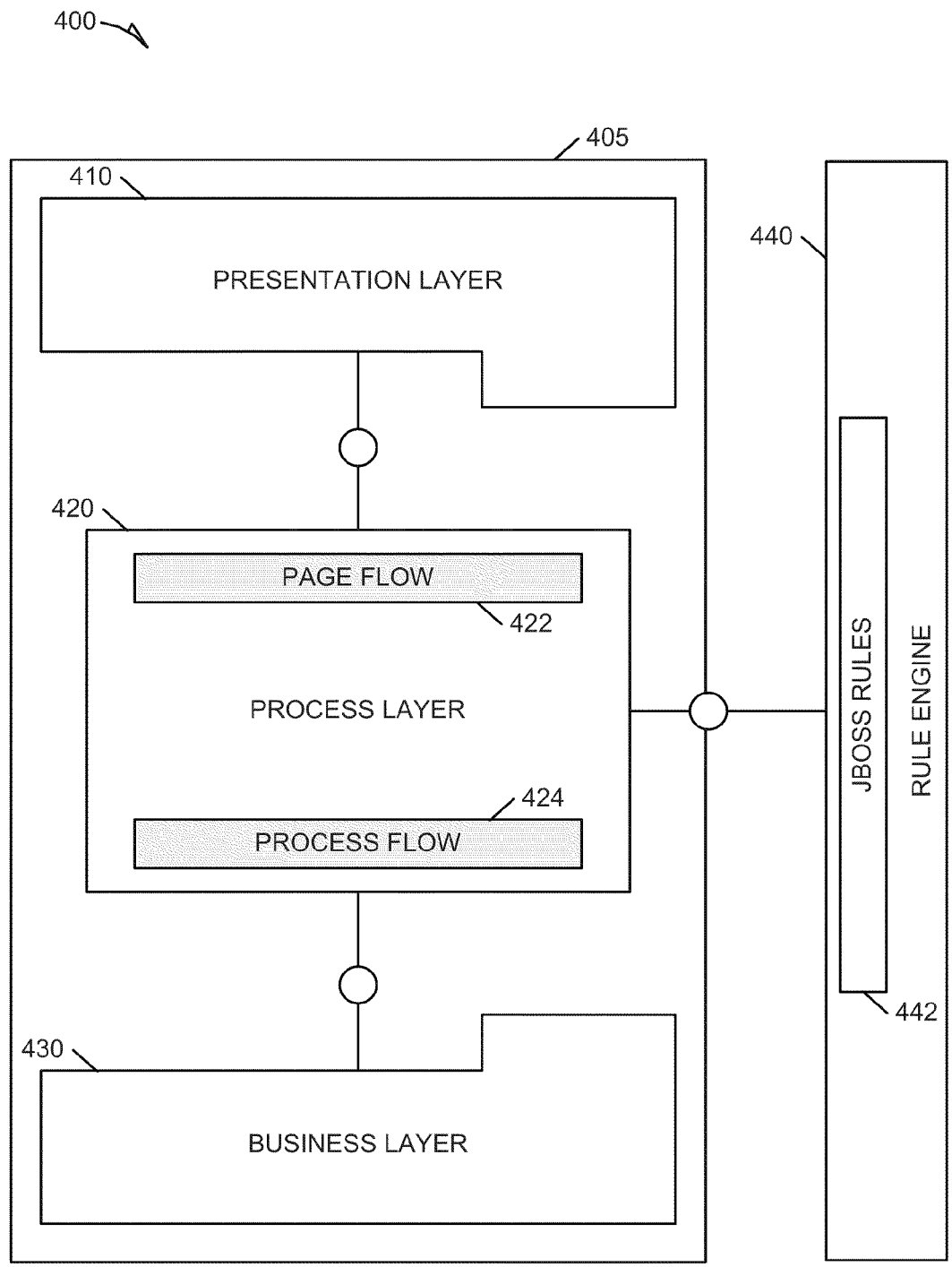
FIG. 4B is a block diagram of a four tier architecture with execution context components, according to an example embodiment.

FIG. 4B is a block diagram of the four tier architecture system 210 with execution context components, according to an example embodiment. A system 400 includes a presentation layer 410, a process layer 420, and a business layer 430. In an example, the process layer 420 includes a page flow engine 422 and a process flow engine 424. In this example, system 400 also includes a rule engine 440 that can extend the architecture of the workflow engine 405 to be context-aware. In this example, JBoss rules 442 can be used to make the process layer 420 context aware, through connection with the rule engine 440. Using rules rather than a static value stored in a database to evaluate a decision node, such as 510, allows external values of context to specify the service and therefore the process as well. The system 400 depicted in FIG. 4B demonstrates setting up a link between the context and the process layer inside the four-tier architecture system 210. Linking in context information can make the processes more flexible and the process flow dynamically changeable during run-time of the application. Dynamic changes to a business process model can include selecting from available variants or take alternative branches in the process flow. Dynamic changes to a business process model can also include a change in a service level agreement (SLA), resourcing needs or requirements, or priority. For example, the system executing a certain service may be changed based on a change in the execution context, see discussion related to FIG. 9 for additional details.

System Architecture

Figure 6:
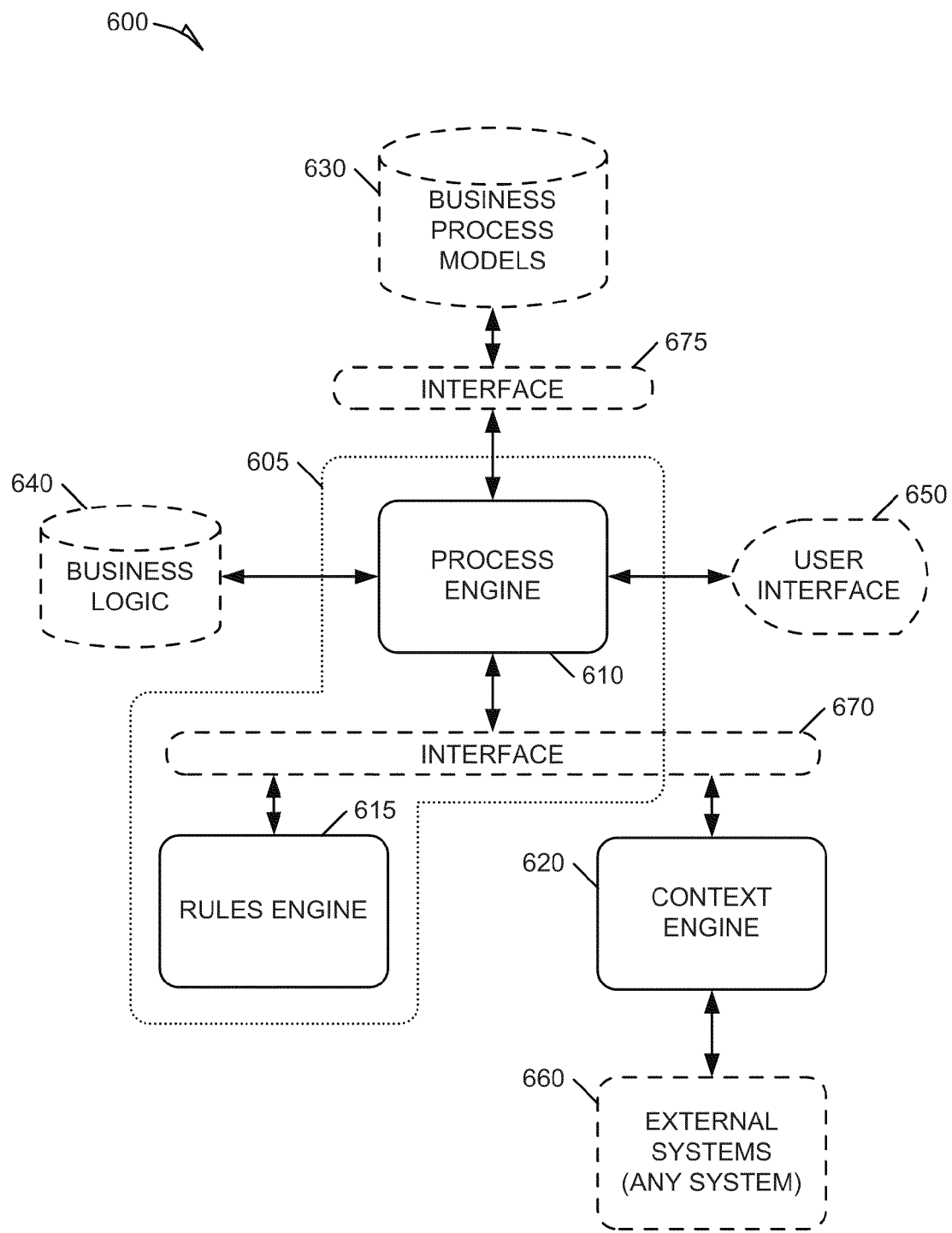
FIG. 6 is a block diagram illustrating a system for dynamic business process configuration using an execution context, according to an example embodiment.

FIG. 6 is a block diagram illustrating a system 600 for dynamic business process configuration using an execution context, according to an example embodiment. The system 600 can include a process engine 610, a rules engine 615, and a context engine 620. Optionally, the system 600 can be configured with a process system 605 integrating the process engine 610 and the rules engine 615 into a single system. In certain examples, the system 600 can include any or all of the following components: a business process models database 630, a business logic database 640, a user interface 650, and external systems 660.

The process engine 610 executes the business process models, which can be stored in the business process model database 630. The process engine 610 can work in conjunction with the rules engine 615 to enable dynamic configuration at run-time for process models executed by the process engine 610. The rules engine 615 can be used to evaluate decision points or gates within a process model. The rules engine 615 communicates with the context engine 620 to obtain relevant context information when evaluating decision gates. A decision gate can include a rule that when applied to a step in the process causes the process to change process flow or select a different process variant.

In an example, the context engine 620 communicates with various external systems 660 to maintain context information relevant to the business process models. As discussed above, context information can include anything relevant to the execution of a business process, such as people, places, things, environmental conditions, financial data, and so forth. The external systems 660 can include systems internal to an organization, such as customer relationship management (CRM) systems, supplier relationship management (SRM) systems, human resource systems, enterprise resource planning (ERP) systems, or internal logistics systems. The external systems 660 can also include systems that may be external to an organization, such as weather information systems, shipment tracking systems, stock market data systems, news reporting systems, or credit reporting systems, among others. Context information can be received from external systems 660 automatically (e.g., where the external systems push updates to the context engine 620) or via some sort of polling mechanism (e.g., where the context engine 620 requests updated information on a pre-determined schedule). Context information can be retrieved through protocols such as XML, HTTP, or SOAP, among others. The context engine 620 can utilize Web Services type applications to retrieve context information as well.

Methods

Figure 7:
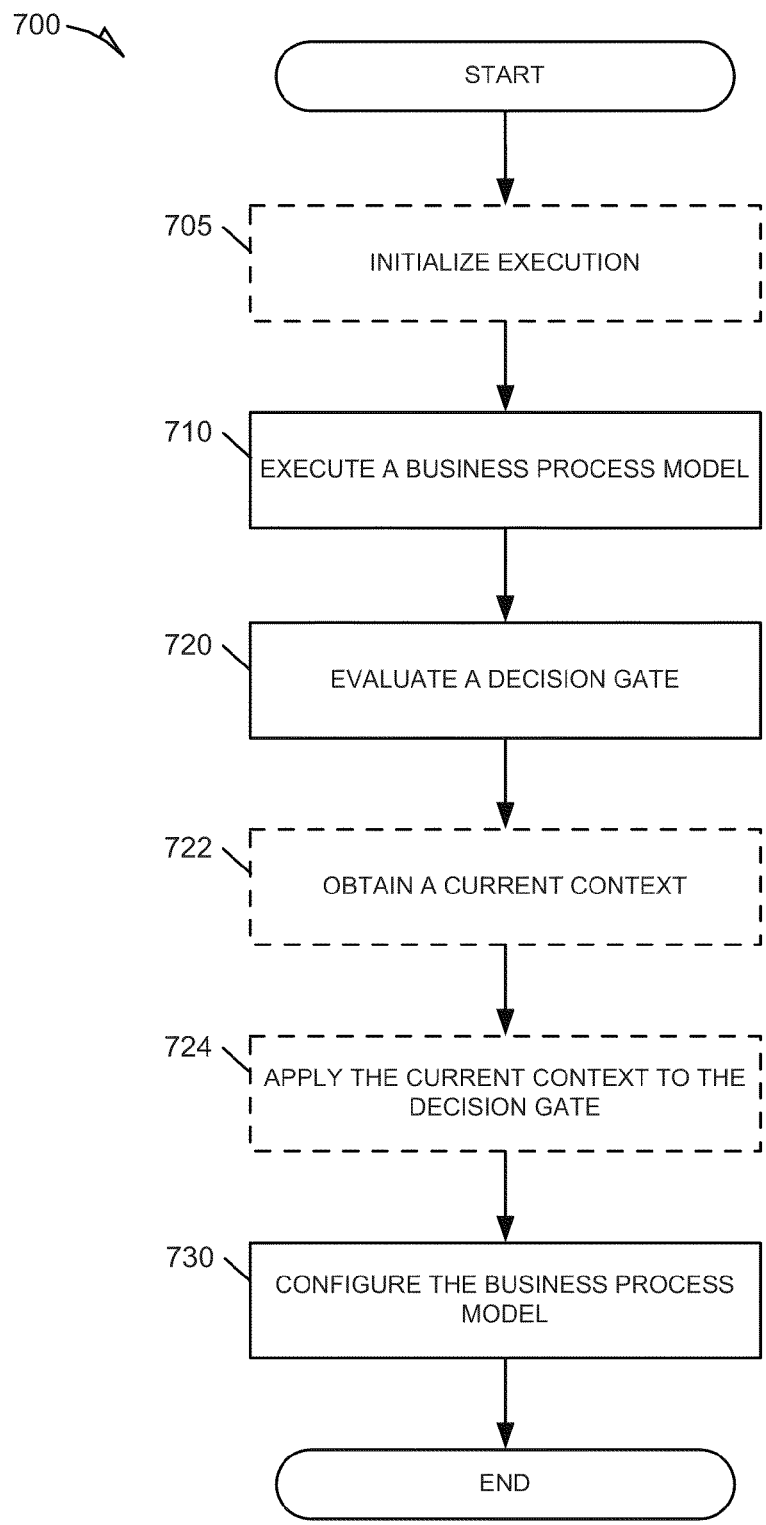
FIG. 7 is a flowchart illustrating a method for dynamically configuring business process models during execution using an execution context, according to an example embodiment.

FIG. 7 is a flowchart illustrating a method 700 for dynamically configuring business process models during execution using an execution context, according to an example embodiment. The method 700 can include executing a business process model at 710, evaluating a decision gate at 720, and configuring the business process model at 730. In certain examples, the method 700 can also include initializing execution at 705, obtaining a current context at 722, and applying the current context to a decision gate at 724. In this example, the method 700 begins at 710 with the process engine 610 executing a business process model. An example business process can include a mortgage application process. In an example, executing a mortgage application process can include presenting the application to a prospective borrower online through a series of web pages.

At 720, the method 700 continues with the rules engine 615 evaluating a decision gate within the business process model being executed by the process engine 710. In the mortgage application example, the decision gate may be evaluating the prospective borrower's credit score. At 730, the method 700 continues with the process engine 610 configuring the business process model based on the rules engine 615 evaluating a decision gate. For example, based on the outcome of the credit score evaluation, the mortgage application process may select from a number of variants that include different levels of required additional financial information. In an example, the process engine 610 can select from the available process variants or process branches, based on evaluation by the rules engine 615. For example, if the prospective borrower's credit scores are low, the process engine 610, while executing the mortgage application process, may select a variant that requires a larger amount of supporting financial information about the borrower.

In certain examples, the method 700 can include operation 722 where the rules engine 615 obtains a current context from the context engine 620 as part of operation 720. In the mortgage application example, the credit score is context information. Additional examples of context that can be obtained from the context engine 620 and used by the rules engine 615 include user interface configurations, such as for color-blind persons, mobile devices, or different locations (e.g., time zone, currency, etc.); functional attributes of a system, such as routing information; personal information, such as age, gender, occupation, or marital status; and environmental information, such as weather or traffic information. At 724, the method 700 continues with the rules engine 615 applying the current context to the decision gate from operation 720. The current or relevant context can refer to a portion of the context information available from the context engine 620 that is relevant or applicable to the decision gate being evaluated by the rules engine 615.

Figure 8:
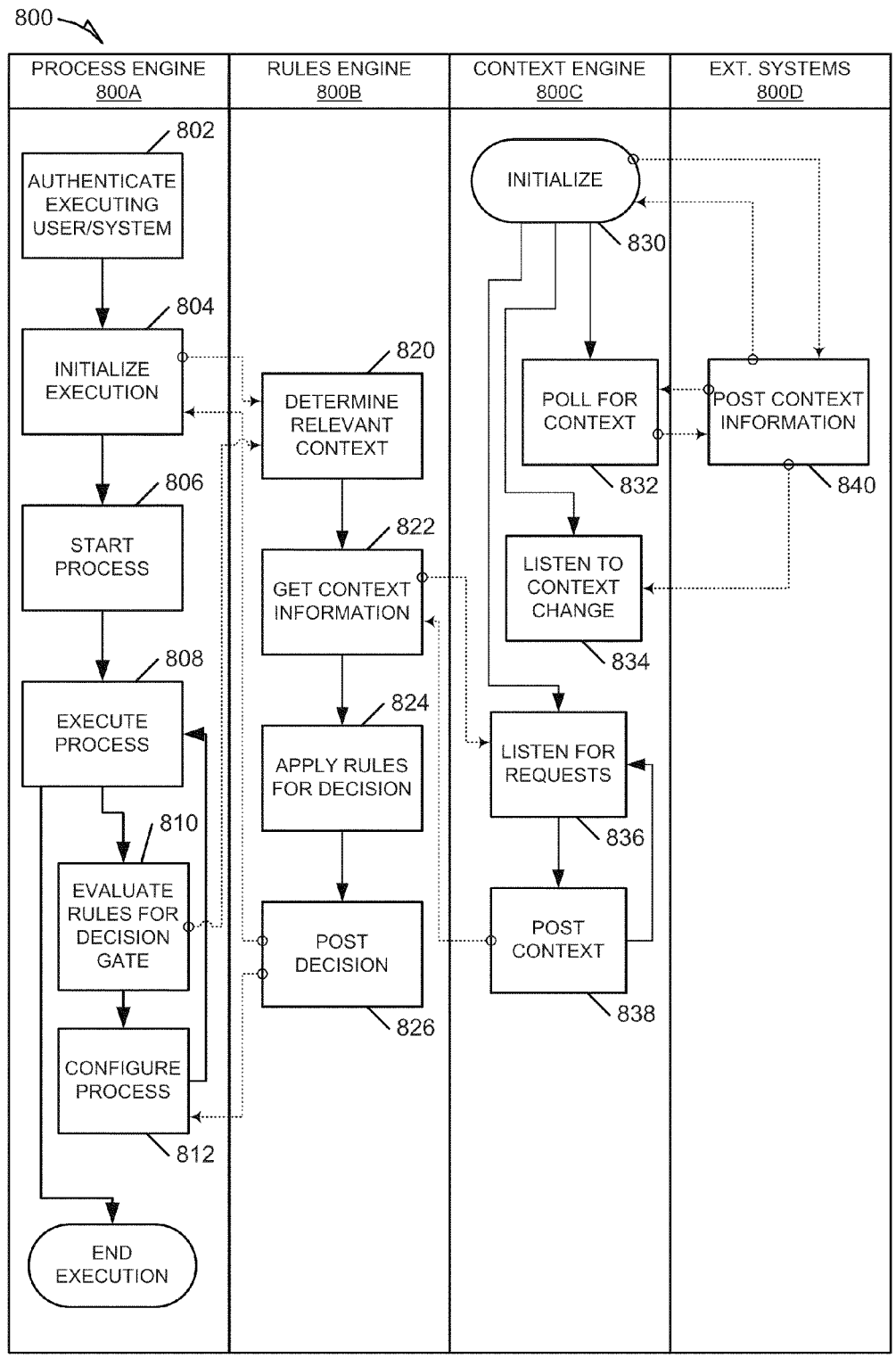
FIG. 8 is a swim lane chart illustrating a series of related methods for dynamic business process configuration using an execution context, according to an example embodiment.

FIG. 8 is a swim lane chart illustrating a series of related methods 800 for dynamic business process configuration using an execution context, according to an example embodiment. Methods 800 include the process engine method 800A, a rules engine method 800B, a context engine method 800C, and an external systems method 800D. The methods 800 are interrelated, but can operate as independent processes. The method 800A can include authenticating the executing user or system at 802, initializing execution at 804, starting the process at 806, executing the process at 808, evaluating rules for the decision gates at 810, and configuring the process at 812. The method 800B can include determining a relevant context at 820, getting context information at 822, applying rules for a decision at 824, and posting the decision at 826. The method 800C can include initializing at 830, polling for context at 832, listening to context changes at 834, listening for requests at 836, and posting context at 838. Finally, the method 800D can include posting context information at 840.

In an example, the method 800A begins at 802 with the process engine 610 authenticating an executing user or system. At 804, the method 800A continues with the process engine 610 initializing execution of the process model. Initialization can include requesting context information from the rules engine 615. For example, the process engine 610 can query the rules engine 615 for general execution parameters associated with the process model. In this example, the rules engine 615 can process the method 800B to obtain SLA and UI requirements for the process model from the context engine 620. The method 800B, which illustrates obtaining context information, is described below. At 806, the method 800A continues with the process engine 610 starting the process to be executed. At 808, the method 800A continues with the process engine 610 executing the process. At 810, the method 800A continues with the process engine 610 sending a request for the rules engine 615 to get context and evaluate a rule or rules associated with a decision gate. Once the decision gate has been evaluated by the rules engine 615, the process engine 610 can configure the process based on information provided by the rules engine 615.

Process execution at 808 can include looping through operations 810 and 812 multiple times to evaluate various decision gates in the process. For example, a process for sourcing a construction commodity may include multiple variants that depend on decision gates for delivery time, required quality, site location, or pricing. Each of the various decision gates will trigger the method 800A to execute operations 810 and 812. For example, in a shipping process model, a decision gate regarding shipment via air transport or surface transport can trigger operation 810 and 812.

The method 800B begins at 820 with the rules engine 615 determining a relevant context based on the decision gate or initialization request communicated by the process engine 610. Operation 820 can be triggered by the method 800A when initializing execution of a process at 804 or during process execution when a decision gate needs to be evaluated at operation 810. For example, a rule within the shipment process model mentioned above can include determining shipment size, weight, and weather conditions to determine a mode of transportation. At 822, the method 800B continues with the rules engine 615 getting context information from the context engine 620. In the shipment example, the context information can include size and weight of the shipment and weather conditions along both the air and surface routes. At 824, the method 800B continues with the rules engine 615 applying the context information to rules in evaluation of a decision gate or in initializing the process to be executed by method 800A. Application of the context information in the shipment example may result in weather along the air route causing the shipment to be routed via surface transportation. At 826, the method 800B finishes with the rules engine 800B posting a decision based on the context information.

The method 800C begins at 830 with the context engine 620 initializing available context information by gathering up to date context information from the external systems 660. In an example, the method 800C includes three parallel operations 832, 834, and 836. The method 800C can also be started prior to execution of the related methods 800A and 800B in order to ensure that context information is available. At 832, the method 800C continues with the context engine 620 polling for context. In some examples, the context engine polls various external systems 660 to update context information. For example, in the shipment process model discussed above, the context engine 620 can poll the National Weather Service to weather information along air and surface transportation routes. At 834, the method 800C runs another of the parallel processes with the context engine 620 listening for context changes. In certain examples, the external systems 660 push or post updates to the context engine 620. At 836, the method 800C runs the last of the parallel operations, with the context engine 620 listening for requests from the rules engine 615. In the shipment process model example, the context engine 620 receives a request for shipment size, weight, and weather information along shipment routes. In certain examples not shown, the process engine 610 can directly request context information from the context engine 620. At 838, the method 800C finishes with the context engine 620 posting context information to the rules engine 615. In the shipment process example, the context engine 620 can post context values associated with the shipment, such as 2.9 m$^3$, 19.9 kg, and winds NE at 8.

The method 800D includes a single operation that encompasses all that is necessary for the various external systems 660 to provide context information to the context engine 620. As described above, the external systems 660 can provide context information through a wide variety of mechanisms.

Dynamic Process Example

Figure 9:
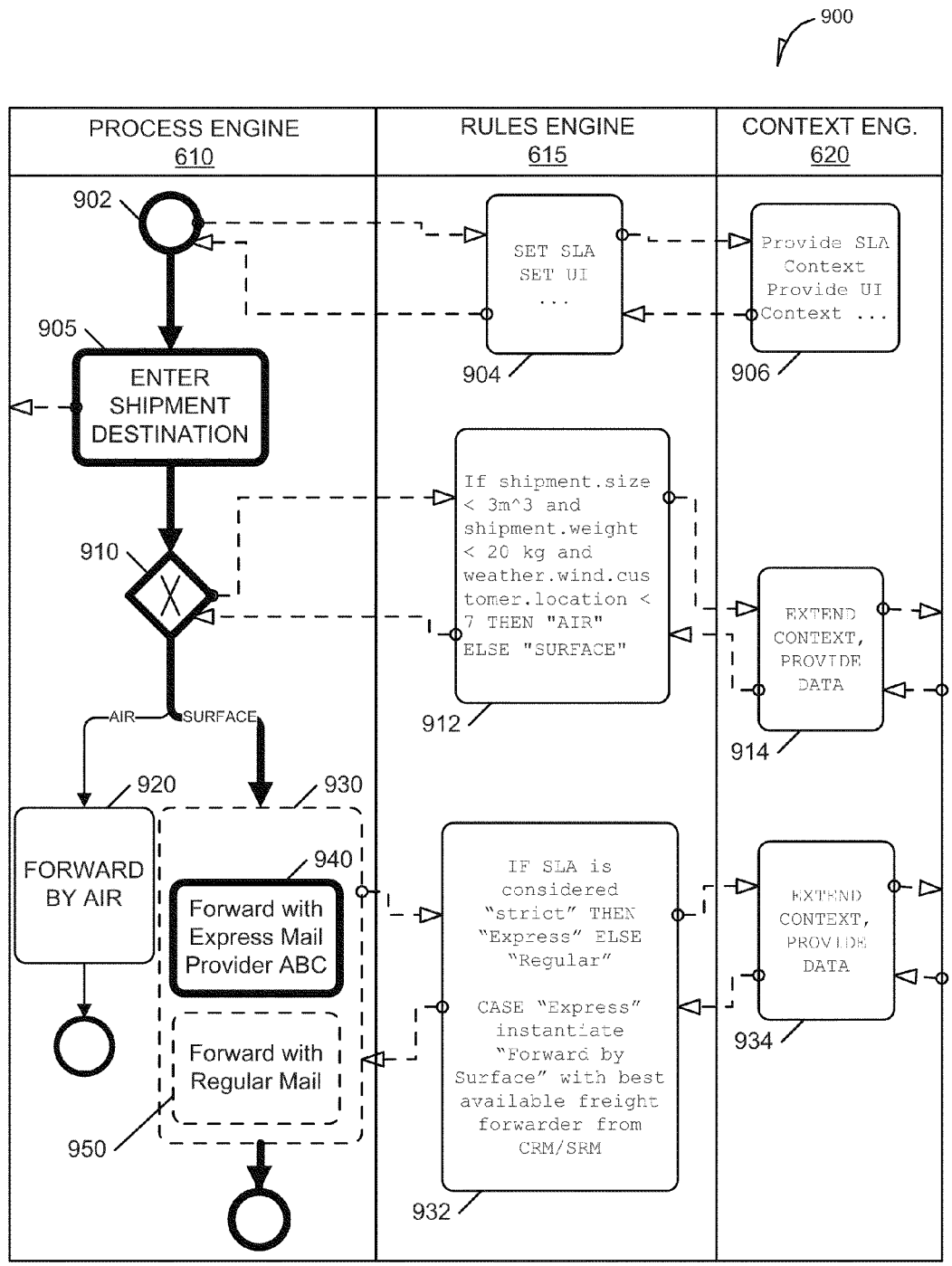
FIG. 9 is a flowchart illustrating an example method of dynamic process model configuration using execution context.

FIG. 9 is a flowchart illustrating an example method 900 of dynamic process model configuration using execution context. The method 900 illustrates an example shipping process model that includes multiple potential branches of execution. This example illustrates how execution context can be used to select different process model branches and how the execution context can be extended at run time. The method 900 is shown within swim lanes associated with the system component that is responsible for execution of each individual operation. The method 900 can include process model initialization at 902, processing initialization rules at 904, providing initialization context at 906, entering shipment destination information at 905, processing a decision gate at 910, processing rules associated with the decision gate at 912, extending context and providing requested data at 914, shipping by air at 920, shipping by surface transport at 930, processing rules associated with surface shipping at 932, extending context and providing requested data at 934, shipping via express mail at 940, and shipping with regular mail at 950.

In this example, the method 900 begins at 902 with the process engine 610 initializing execution of the shipping process model. Initialization can include the process engine 610 sending a query to the rules engine 615 to obtain SLA and UI requirements for the shipping process model. The method 900 continues at 904 with the rules engine 615 processing the query for SLA and UI requirements. In an example, the rules engine 615 sends a query to the context engine 620 to obtain current SLA and UI information based on the current execution context for the shipping process model. At 906, the context engine 620 obtains and returns SLA and UI requirements to the rules engine 615. In an example, the context engine 620 can obtain the requested SLA and UI information from the context information gathered through the process outlined in method 800C, discussed above in reference to FIG. 8. The context engine 620 may access external systems 660, such as a purchasing system, to obtain SLAs applicable to the shipping process model being executed. In certain examples, the context engine 620 uses a Web Service to communicate with the purchasing system via SOAP messages to receive the SLA information.

At 905, the method 900 continues with the process engine 610 receiving information regarding the shipment destination. The shipment destination was previously unknown in this process model and, as will be shown below, this dynamic piece of information affects the relevant context for this process model. The method 900 continues at 910 with the process engine 610 evaluating a decision gate. Evaluation of the decision gate includes the process engine 610 sending a query to the rules engine 615. At 912, the rules engine 615 evaluates rule(s) associated with the decision gate. In this example, the rules are used to determine whether the target package is shipped via air or surface transportation. The example rules are as follows:

IF shipment.size <3 $m^3$; shipment.weight <20 kg; and weather.wind.customer.location <7; THEN "AIR" ELSE "SURFACE"

The rules engine 615 sends a query to the context engine 620 to obtain the context information needed to evaluate the rule(s). In this example, the delivery location was unknown at initialization. Thus, the context engine extends the current context relevant to this process model to include weather information at the delivery location. Context information can also be extended to include relevant weather conditions along delivery routes for both air and surface transportation routes. Additionally, the context information can be extended further to include traffic information along multiple surface transportation routes, among other things.

If the context engine 620 returns information regarding the shipment such as size is 2.3 $m^3$, weight is 19 kg and wind at delivery location is under 7, then the method 900 finishes at 920 with the process engine 615 determining that the package will be forwarded via air transport. However, if the context engine 620 returns (posts) context values such as size is 2.9 $m^3$, weight is 17.6 kg, and wind at delivery location is 23, then the method 900 continues at 930 with the process engine 615 determining, based on rule evaluation by the rules engine 615, that the package can be sent via surface transportation. In this example shipment process model selecting a surface transport mode can include an additional decision gate at 930. The additional decision gate at 930 configures the shipment process model to handle different SLA requirements. At 930, the process engine 610 sends a query to the rules engine 615 to evaluate rules associated with transportation via surface transport modes. At 932, the rules engine 615 evaluates SLA rules, such as the following:

IF SLA is considered "strict" THEN "Express" ELSE "Regular"

In this example, the rules engine 615 sends a query to the context engine 620 to determine whether the current shipment SLA is considered "strict." Determination of whether the current SLA is "strict" may require the rules engine 615 to evaluate additional context information, from the context engine 620, such as inventory or production orders. The context engine 620 may need to update context information from various external systems 660 in order to obtain inventory or production order data. For example, the context engine 620 may need to poll the inventory control system to determine how critical the current shipment is to meet production demand. This additional information is another example of extending the execution context during run time.

In the example illustrated by FIG. 9, the rules engine 615 obtains SLA information from the context engine 620 to determine that the SLA is strict. At 934, the method 900 continues with the context engine 620 extending the execution context to include additional information regarding shipment via express surface transport. For example, the execution context may be extended to include information regarding preferred freight vendors. In this example, the context engine 620 can obtain freight vendor information from a customer relationship management (CRM) or sales relationship management (SRM) system (example external systems 660). At 940, the method 900 can finish by forwarding the shipment via an express surface transport provider as indicated by the context engine 620.

Figure 10:
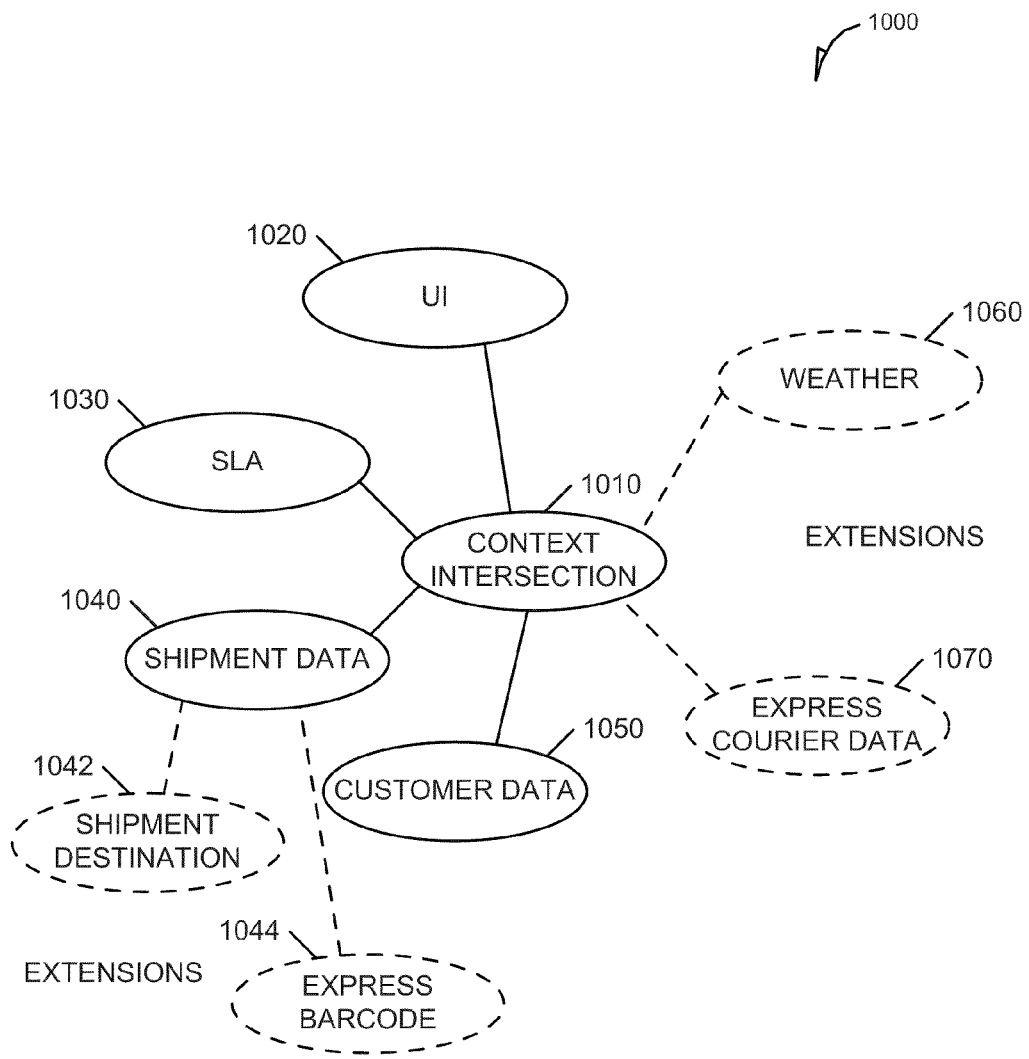
FIG. 10 is a block diagram illustrating an extensible execution context, according to an example embodiment.
Figure 11:
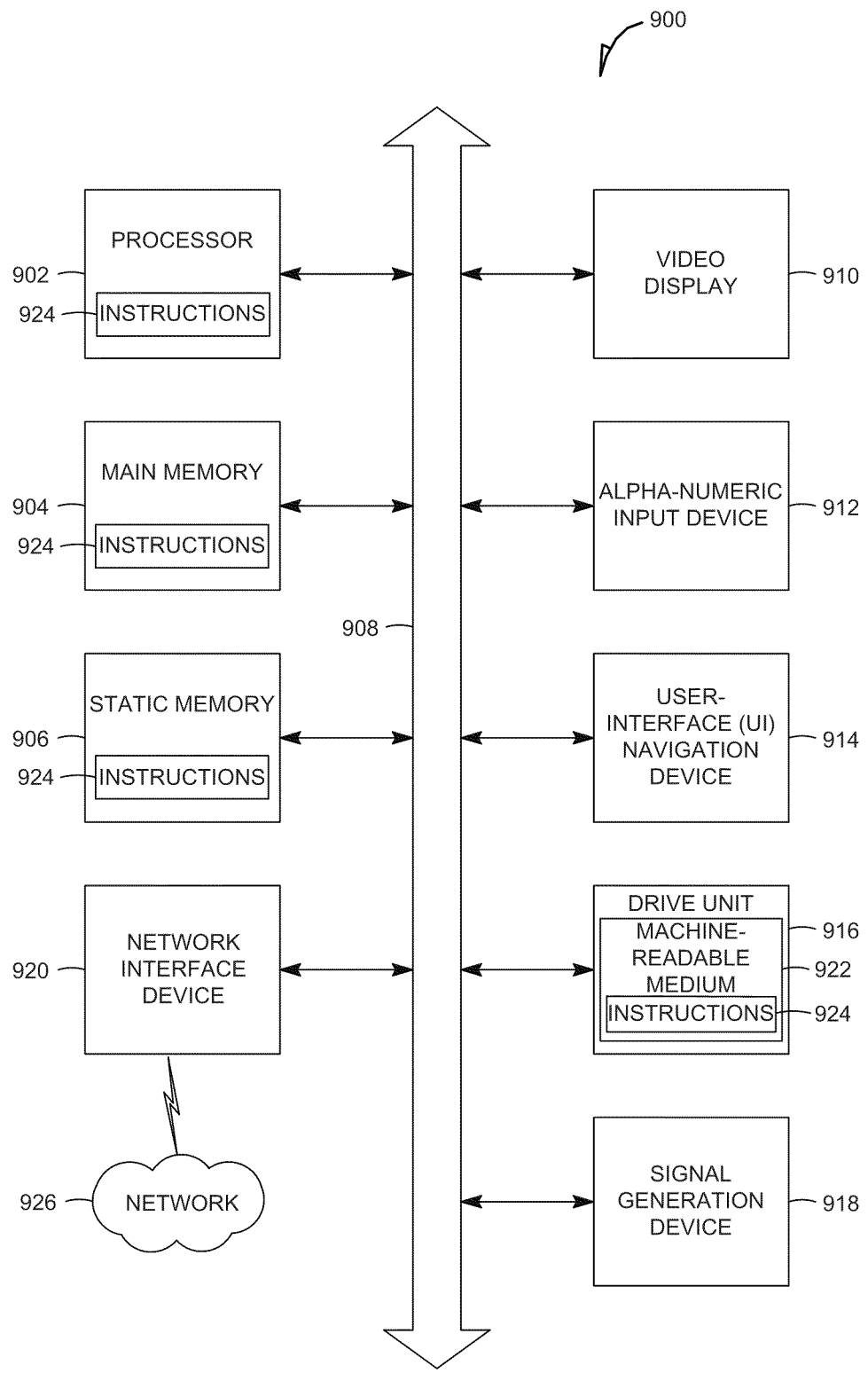
FIG. 11 is a block diagram of a machine in the example form of a computer system within which instructions for causing the machine to perform any one or more of the methodologies discussed herein, may be executed.

FIG. 10 is a block diagram illustrating an extensible execution context 1010, according to an example embodiment. The execution context 1010 illustrated in FIG. 10 follows the example discussed in reference to FIG. 9. The execution context 1010 initially includes UI requirements 1020, SLA requirements 1030, shipment data 1040, and customer data 1050. During execution of the shipment process model (described in relationship to method 900 depicted in FIG. 9), the context engine 615 extends the shipment data 1040 to include a shipment destination 1042 and an express barcode 1044. In this example, the context engine 615 also extends the execution context 1010 to include weather related information 1060 and express courier data 1070.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of these. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, for example, a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

FIG. 9 is a block diagram of a machine in the example form of a computer system 900 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of data structures and instructions (e.g., software) 924 embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more data structures and instructions 924. The term "machine-readable medium" shall also be taken to include any tangible medium that is capable of storing, encoding or carrying instructions for execution by the machine and that cause the machine to perform any one or more of the methodologies of the present embodiments of the invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for making contextual recommendations to users on a network-based marketplace have been described. Although the present embodiments of the invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system to dynamically configure a process model, the system comprising:
a server including one or more processors, the one or more processors executing a plurality of engines, the engines comprising,
a context engine to maintain context information related to an executable business process model, the context information being dynamically extensible during execution of the executable business process model;
a rules engine, coupled to the context engine, to obtain a relevant context from the context engine based on the context information, the relevant context associated with a step and an associated rule to control the step within the executable business process model; and
a business process engine to execute the executable business process model, and to dynamically configure the executable business process model, during execution, based on the rules engine applying the relevant context to the associated rule controlling the step within the business process model.

2. The system of claim 1, wherein the rules engine is to modify the executable business process model during execution based on the relevant context obtained from the context engine.

3. The system of claim 2, wherein the context engine is to alter the contents of the relevant context based on the rules engine modifying the executable business process model.

4. The system of claim 1, wherein the business process engine is to initialize execution of the executable business process model by obtaining an initialization context from the context engine.

5. The system of claim 4, wherein the rules engine is to select one of a plurality of variants within the executable business process model based on the initialization context obtained from the context engine.

6. The system of claim 1, wherein the context engine is to periodically update the context information from an external system.

7. The system of claim 6, wherein the context engine is to poll, at determinable intervals, the external system to update the context information.

8. The system of claim 6, wherein the context engine is to automatically receive updates to the context information from the external system.

9. A method comprising:
executing a business process model on a processor-implemented process engine, the business process model including a decision gate that presents a decision point within a process flow of the business process model;
evaluating the decision gate with a processor-implemented rules engine, the rules engine obtaining, during execution of the business process model from an external source, a current context of the business process model from a context engine and applying the current context to the decision gate; and
configuring, using one or more processors during execution, the business process model based on the rules engine evaluation of the decision gate.

10. The method of claim 9, wherein the configuring of the business process model includes altering content of the current context provided by the context engine, wherein the content of the current context controls a set of inputs monitored by the context engine.

11. The method of claim 9, wherein the executing includes initializing execution of the business process model, the initializing including obtaining the current context of the business process model.

12. The method of claim 11, wherein the initializing execution of the business process model includes selecting one of a plurality of variants within the business process model based on the current context.

13. The method of claim 9, further including periodically updating the current context using a context engine, the context engine obtaining context changes from external systems.

14. The method of claim 13, wherein the updating of the current context comprises the context engine polling the external systems for context updates at determinable intervals.

15. The method of claim 13, wherein the updating of the current context includes the context engine receiving updates from external systems.

16. The method of claim 9, wherein the current context provides information on an execution environment for use during execution of the business process model.

17. The method of claim 16, wherein the information on the execution environment includes:
geographic location data, regulatory compliance data, historical transaction data, business process actor data, associated business process data, temporal data, and execution system data.

18. A non-transitory machine-readable storage medium embodying instructions which, when executed by a computer-implemented system, cause the computer-implemented system to execute a method comprising:
executing a business process model on a process engine, the business process model including a decision gate, the decision gate including a decision point within a process flow of the business process model;
evaluating the decision gate with a rules engine, the rules engine obtaining, during execution of the business process model from an external source, a current context of the business process model from a context engine and applying the current context to the decision gate; and
configuring, during execution, the business process model based on the rules engine evaluation of the decision gate.

19. The non-transitory machine-readable storage medium of claim 18, wherein the configuring of the business process model includes altering content of the current context provided by the context engine, and wherein the content of the current context controls a set of inputs monitored by the context engine.

20. The non-transitory machine-readable storage medium of claim 18, wherein the executing includes initializing execution of the business process model, the initializing including obtaining the current context of the business process model.

21. The non-transitory machine-readable storage medium of claim 20, wherein the initializing execution of the business process model includes selecting one of a plurality of variants within the business process model based on the current context.

22. The non-transitory machine-readable storage medium of claim 18, further including periodically updating the current context using a context engine, the context engine obtaining context changes from external systems.

23. The non-transitory machine-readable storage medium of claim 22, wherein the updating of the current context comprises the context engine polling the external systems for context updates at determinable intervals.

24. The non-transitory machine-readable storage medium of claim 22, wherein the updating the current context includes the context engine receiving updates from external systems.

* * * * *